United States Patent
Takimoto

[19]

[11] Patent Number: 6,041,350
[45] Date of Patent: Mar. 21, 2000

[54] NETWORK MANAGEMENT SYSTEM BASED UPON MANAGED OBJECTS

[75] Inventor: Minoru Takimoto, Kawasaki, Japan

[73] Assignee: Fujitsu Limited, Kanagawa, Japan

[21] Appl. No.: 09/039,775

[22] Filed: Mar. 16, 1998

[30] Foreign Application Priority Data

Oct. 20, 1997 [JP] Japan .................................. 9-287100

[51] Int. Cl.⁷ ............................................... G06F 15/16
[52] U.S. Cl. .......................................... 709/223; 709/224
[58] Field of Search .................................... 709/223, 224,
709/248; 710/17, 18; 714/39, 47, 51; 707/103,
104, 102, 1; 370/350

[56] References Cited

U.S. PATENT DOCUMENTS

| | | | |
|---|---|---|---|
| 5,726,979 | 3/1998 | Henderson et al. | 370/254 |
| 5,764,955 | 6/1998 | Doolan | 395/500 |
| 5,848,243 | 12/1998 | Kulkarni et al. | 395/200.54 |
| 5,867,495 | 2/1999 | Elliot et al. | 370/352 |
| 5,920,542 | 7/1999 | Henderson | 370/217 |

FOREIGN PATENT DOCUMENTS

1194592  8/1989  Japan .

*Primary Examiner*—Mehmet B. Geckil
*Attorney, Agent, or Firm*—Helfgott & Karas, PC

[57] ABSTRACT

Duplicates (duplicate managed objects) of managed objects that have been generated by a network element management system in order to manage the states of a plurality of network resources are produced and stored in a management information database of a network management system. Before transmitting a series of handling directives regarding a managed object generated by a network management request from a user terminal or service management system, to the network element management system, the network management system simulates the handling directives using the duplicate managed objects and notifies the source of the request of the results of simulated behavior. The network management system transmits the series of handling directives to the network element management system when the simulated behavior ends normally but does do so when the simulated behavior ends abnormally.

7 Claims, 10 Drawing Sheets

NETWORK MANAGEMENT SYSTEM BASED UPON MANAGED OBJECTS

BACKGROUND OF THE INVENTION

This invention relates to a network management system for managing the entirety of a network via a network element management system which manages a large number of network elements of a wide variety using managed objects. More particularly, the invention relates to a network management system, which is connected to one or a plurality of network element management systems each connected to one or more network elements, for performing network management via these network element management systems.

There is available a network management system for managing the entirety of a network via a network element management system which manages a large number of network elements of a wide variety using managed objects.

According to the prior art, such a network management system has a manager-agent architecture stipulated by the ISO and manages network elements or networks while transmitting handling directives to managed objects in the network element management system using a prescribed management protocol, e.g., a CMIP (Common Management Information Protocol).

Figure 7:
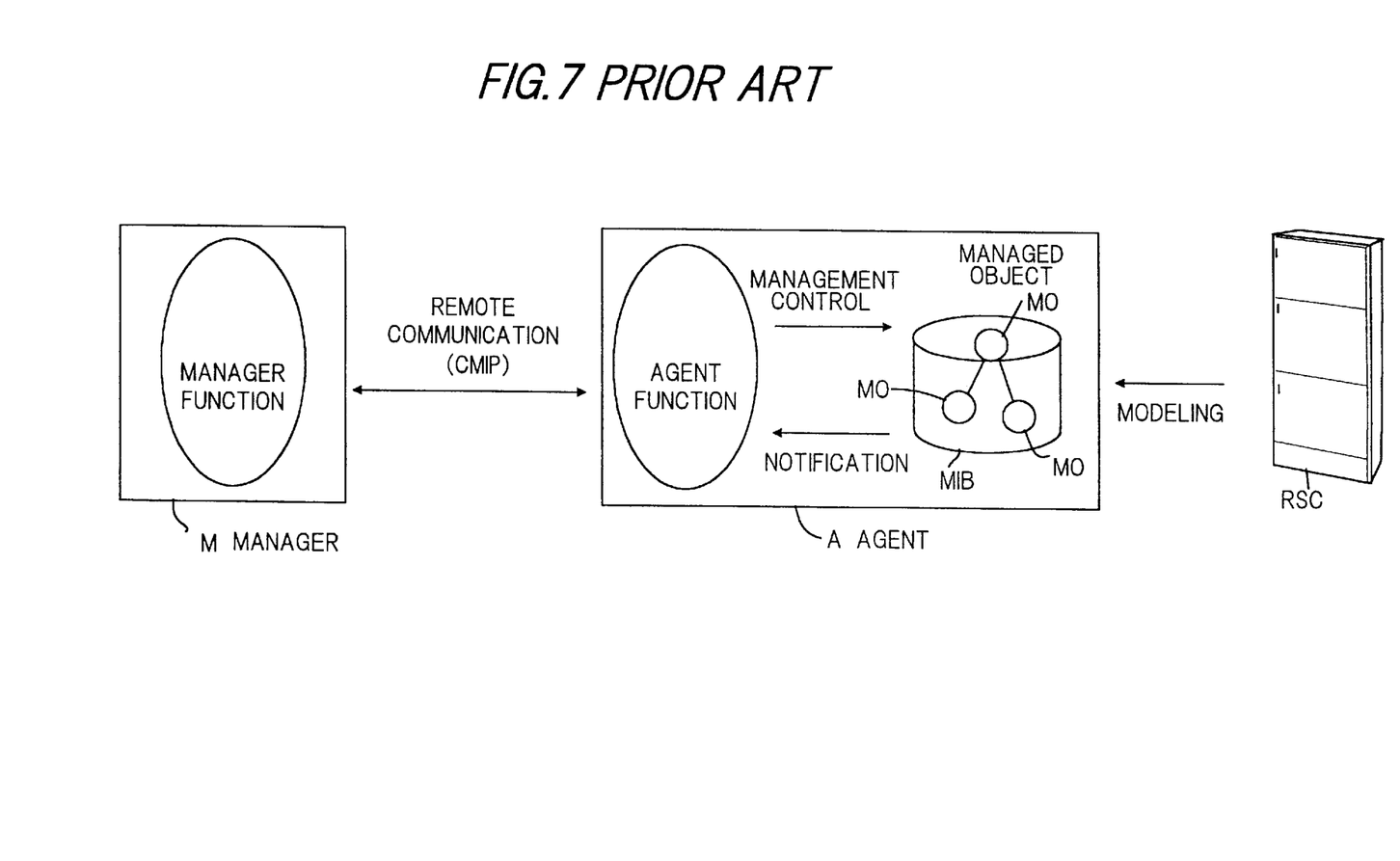
FIG. 7 is a diagram useful in describing a system management model according to the prior art.

FIG. 7 is a diagram useful in describing a system management model and illustrates the relationship among manager-agent architecture, CMIP and managed objects MO. A manager M manipulates or controls the managed objects MO, which are managed by a management information database (MIB) within an agent A.

Using an object-oriented technique, the managed object MO model network resources RSC constituting a network. Examples of the resources are lines, multiplexer/demultiplexers and virtual communication paths. Variables representing various states (attributes) possessed by each of the network resources RSC are referred to as attribute information possessed by the managed objects. Network management refers to the manipulation of the managed objects MO and the manipulations include:

(1) creating managed objects (M-CREATE);

(2) deleting managed objects (M-DELETE);

(3) reading out attributes of managed objects (attribute acquisition) (M-GET);

(4) setting or changing attributes of managed objects (M-SET);

(5) executing functions possessed by the managed objects (M-ACTION); and (6) receiving event notification from managed objects (M-EVENT-REPORT).

The manager M is a mechanism for performing the core functions that implement network management. The manager M does not control the managed objects directly but rather it is the agent A that controls the managed objects. To accomplish this, the manager M sends handling directives to the agent A using the management protocol CMIP, thereby controlling the managed objects indirectly to perform network management. This management operation makes it possible to manipulate a plurality of managed objects MO simultaneously by a single management operation.

Figure 8:
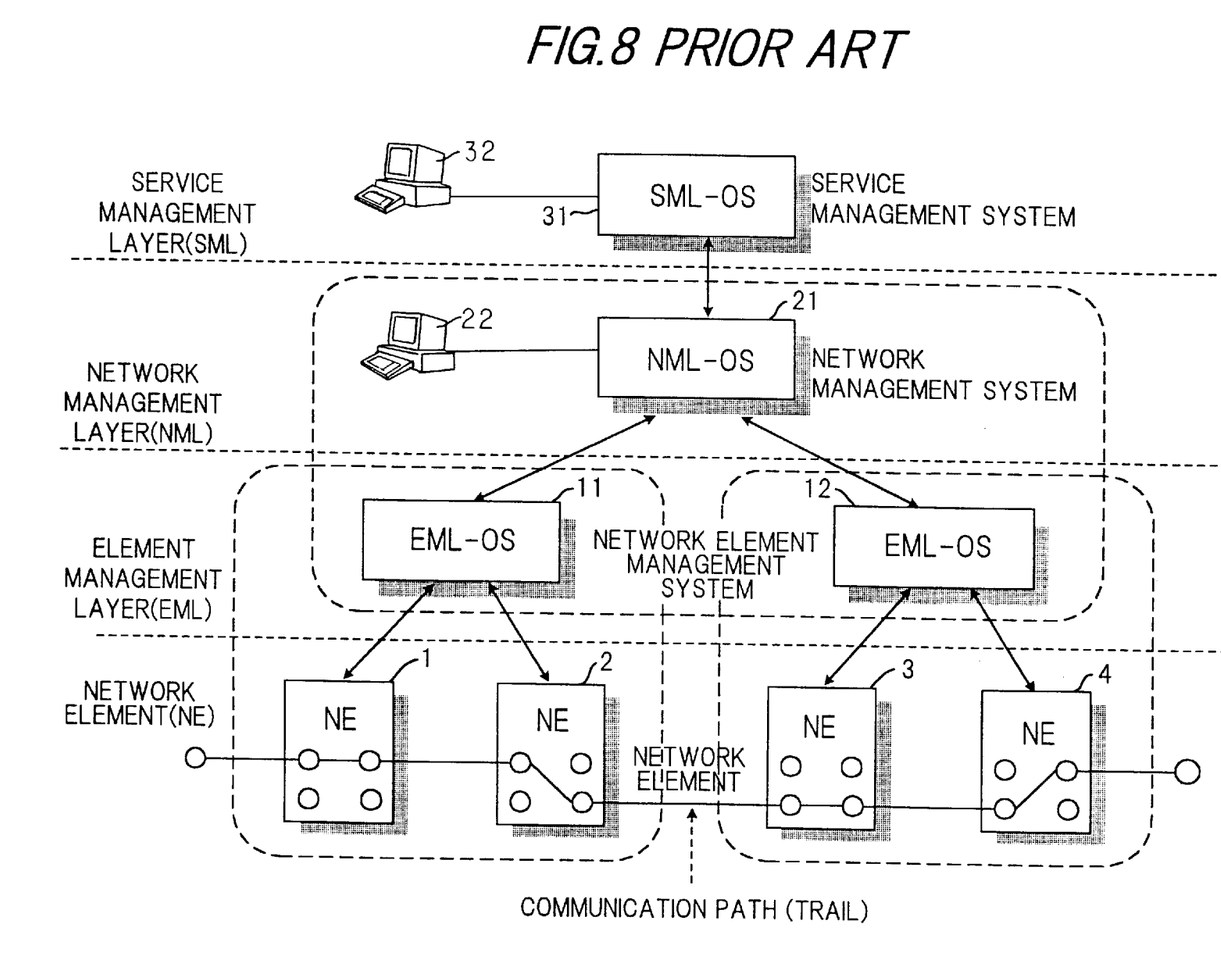
FIG. 8 is a diagram illustrating the concept of network hierarchy according to the prior art.

FIG. 8 is an explanatory view showing the concept of a basic network hierarchy in network management. In a TMN (Telecommunication Management Network) stipulated by the 3000 Series of ITU-TM Recommendations, network management functions are classified into the following four layers to clarify them:

(1) an element management layer EML;

(2) a network management layer NML;

(3) a service management layer SML; and (4) a business management layer BML (not shown).

Network element management systems (EML-OS) 11, 12 are connected to one or a plurality of network elements (NE) 1~4 and control managed objects to thereby managed each network element. A network management system (NML-OS) 21 is connected to one or a plurality of network element management systems 11, 12 and manages the network elements of the overall network via these network element management systems. More specifically, the network management system 21 manages network information such as the network element management systems 11, 12 that manage the network elements, the individual management domains (network elements) of these network element management systems and the communication paths connecting these domains.

A service management system (SML-OS) 31, which is connected to the network management system 21, requests the network management system 21 for prescribed network information in accordance with a directive from a user interface (user terminal) 32, receives this network information and then outputs the same. Further, a user terminal 22 requests the network management system 21 for prescribed network information directly, receives this information and either displays the information on a display unit or prints out the information by means of a printer.

Figure 9:
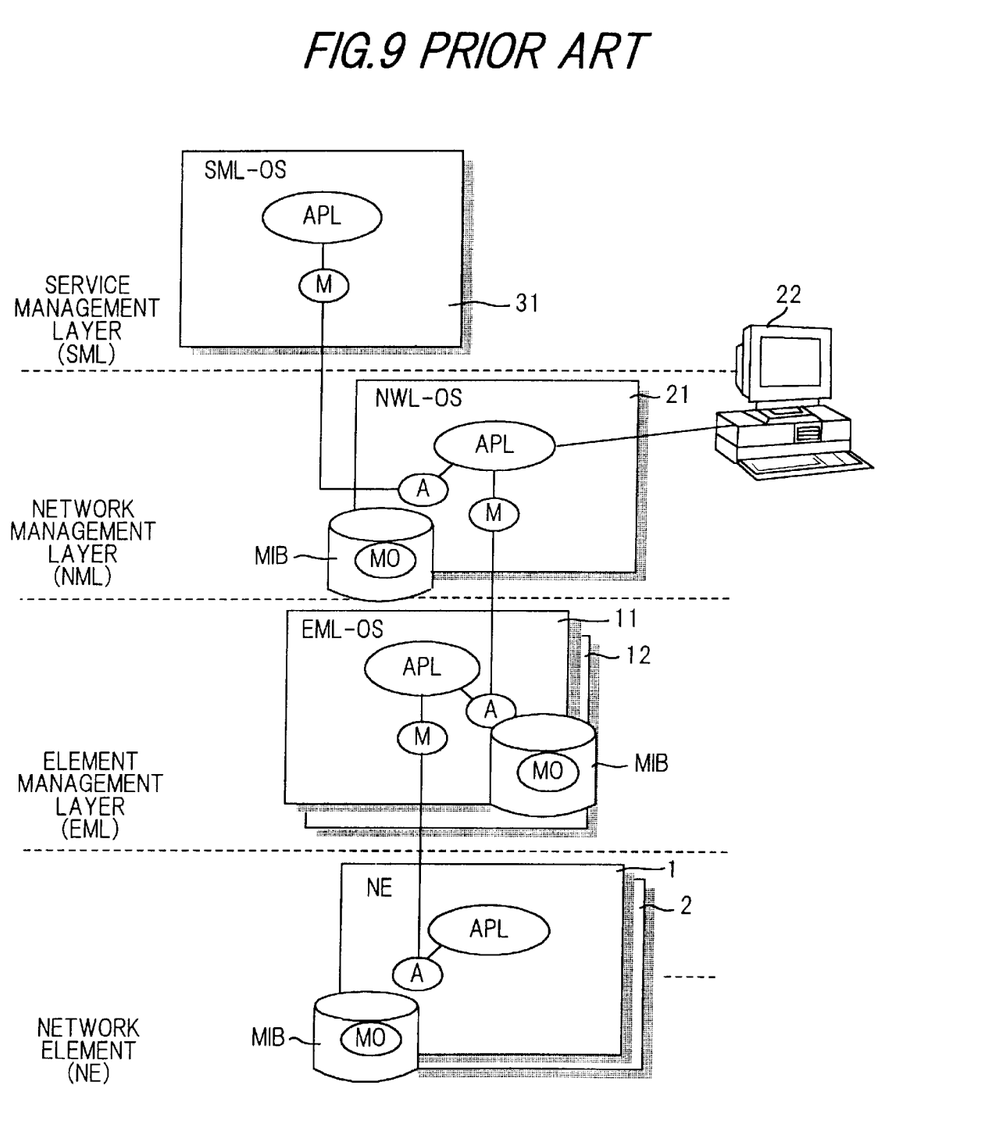
FIG. 9 is a diagram useful in describing relationships between systems according to the prior art.

FIG. 9 is a diagram useful in describing the relationships between systems. FIG. 9 shows the relationships between the systems of FIG. 8 taking into consideration the manager-agent architecture of FIG. 7. Shown in FIG. 9 are agents A, managed objects MO, applications APL and management information databases MIB. Higher and lower layers have a manager—agent relationship and communicate via the management protocol CMIP.

The network management system 21 functions as an agent A for storing managed objects MO, which are for managing the network information connecting the network element domains, in the management information database MIB, and supplying the service management system 31 with the network information. Further, the network management system 21 acts as the manager M of the network element management systems 11, 12 and performs network management by manipulating managed objects MO (obtained by modeling each of the network elements), which have been stored in the management information database MIB, via the agent function of the network element management systems 11, 12. Further, the network management system 21 makes it possible to specify network information manipulation directly from a user terminal via a user interface function.

The network element management systems 11, 12 function as agents A for storing managed objects MO, which are for managing network information such as the network elements connected to these systems 11, 12 and the lines connecting these network elements, in the management information database MIB, and supplying the network management system 21 of the higher layer with the network information. Further, the network element management systems 11, 12 act as managers of the network elements 1, 2 and perform network management within limits specified by manipulating managed objects MO, which have been stored in the management information database MIB, via the agent function of the network elements 1, 2.

Figure 10:
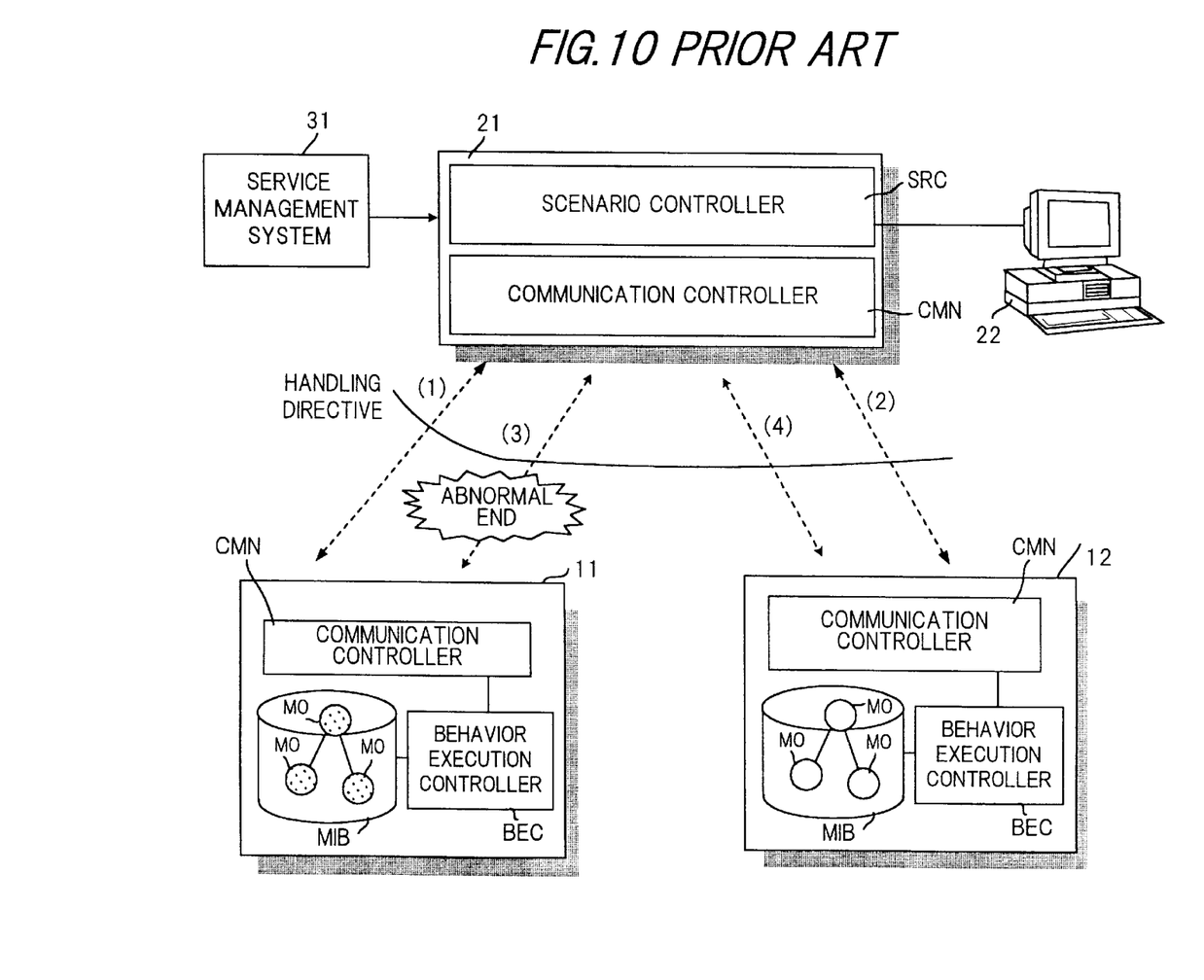
FIG. 10 is a diagram useful in describing the problems of a system according to the prior art.

FIG. 10 is a diagram useful in describing problems encountered with conventional network management. Each of the network element management systems 11, 12 has a communication controller CMN for implementing control of communication with the network management system 21, which is the higher layer, the management information database MIB for storing managed objects MO, and an behavior execution controller BEC for controlling prescribed managed objects MO. The behavior execution controller BEC performs network control by (1) controlling managed objects MO in accordance with handling directives from the network management system 21 or (2) controlling managed objects MO autonomously. The network management system 21 has a scenario controller SRC. When a network information acquisition request or modification request or some other network management request is entered from the user terminal 22 or service management system 31, the scenario controller SRC outputs a series of handling directives, which are required to implement these requests, as a scenario. The network management system 21 further includes the communication controller CMN for controlling communication with the network element management systems 11, 12 of the lower layer.

There are cases where the network management system 21 executes processing to modify network information in response to a request from the service management system 31 or user terminal 22. Upon being requested to execute such processing for modifying network information, the network management system 21 must transmit handling directives (1)–(4) for a plurality of managed objects to the plurality of network element management systems 11, 12. To accomplish this, the network management system 21 handles the handling directives for the plurality of managed objects as a single scenario, repeatedly transmits the handling directives to each of the network element management systems 11, 12 in numerical order and verifies the result of the response to the handling directives to thereby modify the network information.

However, when a handling directive fails in the midst of a scenario, i.e., when a response to manipulation is erroneous for some reason, the service management system 31 or user terminal 22 must be notified of the fact that execution of the network information modification processing ended abnormally. In addition, it becomes necessary to execute processing ("rollback" processing) for returning the attribute value of each managed object to the value that prevailed prior to the modification. Rollback processing is carried out by (1) executing attribute value acquisition processing (M-GET) before executing processing (M-SET) for setting an attribute value, (2) executing processing for setting the attribute value under conditions in which the currently prevailing attribute value is saved, and (3) if it becomes necessary to restore an attribute value to the value that prevailed prior to the modification, executing processing for setting the attribute value that has been saved.

In accordance with conventional network management described above, the number of times transmissions and responses are made between the network management system 21 and the network element management systems 11, 12 increases. Moreover, pre-processing for rollback is required. Consequently, a problem which arises is lengthening of response time for responding to the service management system 31 and user terminal 22.

Further, the program for the network management system 21 is not always defined so as to abort execution of the functions possessed by the managed objects. In order to accomplish this, more complicated program logic would be required.

SUMMARY OF THE INVENTION

Accordingly, an object of the present invention is to provide a network management system so designed that when a network management request has been issued by a higher layer service management system or user terminal, the request can be responded to in a short period of time.

Another object of the present invention is to dispense with rollback processing in a case where a handling directive fails in the midst of a scenario, thereby simplifying the logic of the program for the network management system and reducing the burden on the overall network, such as the network elements and network element management system.

Another object of the present invention is to improve the agreement between attribute values of duplicate managed objects in a network management system and attribute values of managed objects in a network element management system and to make it possible to respond accurately to a higher layer service management system or user terminal in a short period of time In accordance with the present invention, the foregoing objects are attained by providing a network management system, which is connected to one or a plurality of network element management systems each connected to one or more network elements, for performing network management via these network element management systems, comprising (1) a management information database for storing duplicates (duplicate managed objects) of managed objects which are generated in order to manage states of network resources constituting a network and managed in each network element management system, (2) a simulated behavior execution controller for simulating behavior of a managed object, which is executed in each network element management system, as behavior of a duplicate managed object that has been stored in the management information database, (3) a transaction controller for performing control to deliver a series of handling directives for a plurality of managed objects managed in each network element management system to the simulated behavior execution controller, cause modified content that is based upon simulated behavior to be reflected in the management information database if simulated behaviors with regard to all handling directives end normally, and discard modified content with regard to all managed objects so that this modified content will not be reflected in the management information database if there is even one handling directive that ends abnormally, and (4) a communication controller for delaying the series of handling directives for each network element management system until all simulated behavior execution control ends normally.

Other features and advantages of the present invention will be apparent from the following description taken in conjunction with the accompanying drawings.

Figure 1:
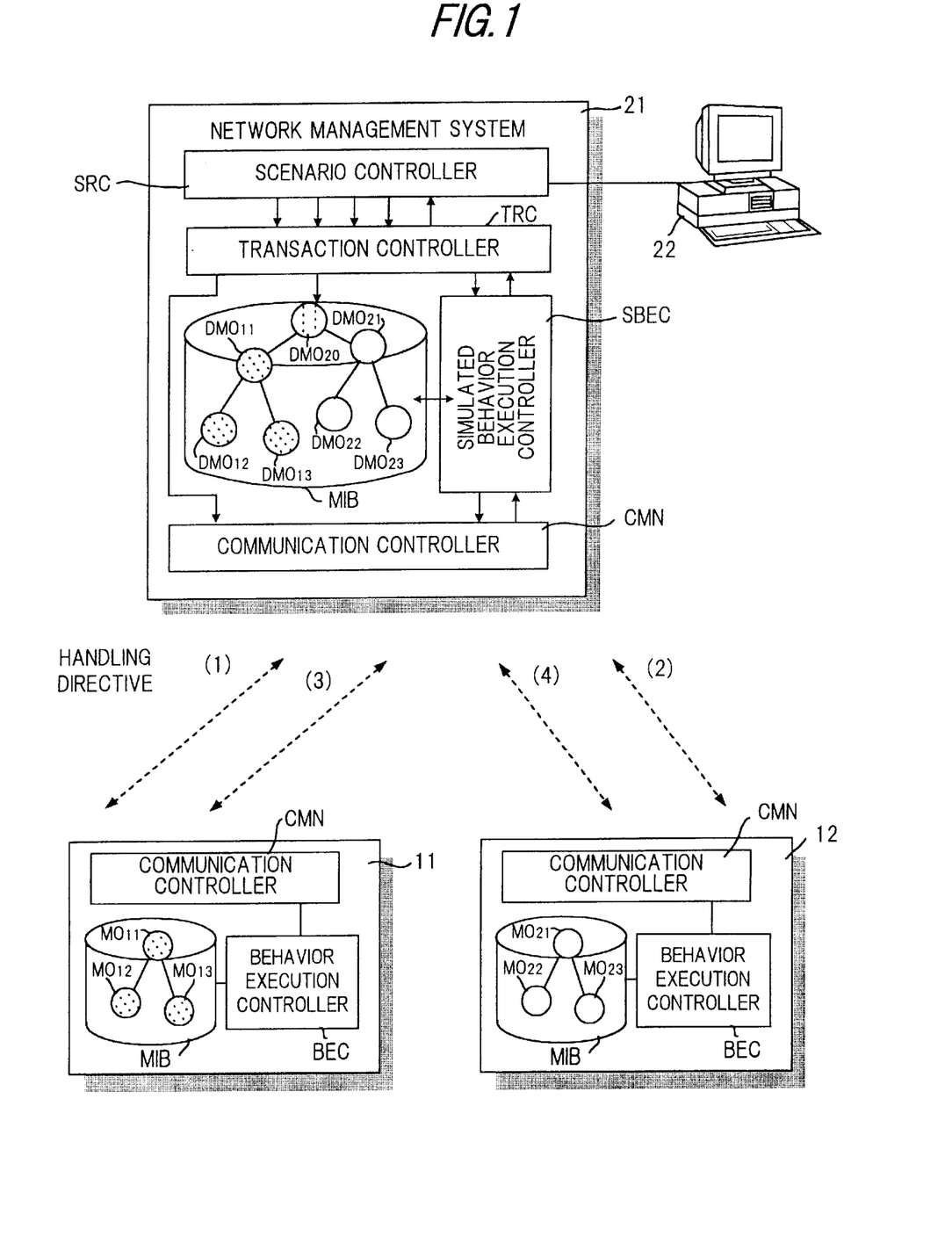
FIG. 1 is a diagram showing the configuration of a first embodiment of the present invention.

DESCRIPTION OF THE PREFERRED EMBODIMENTS (A) Overview of the Invention (a) General Solutions As shown in FIG. 1, a network management system 21 according to the present invention comprises (1) a management information database MIB for storing duplicates (duplicate managed objects DMO) of managed objects MO which are generated in order to manage states of network resources constituting a network and managed in each of the network element management systems 11, 12, (2) a simulated behavior execution controller SBEC for simulating behavior of a managed object MO, which is executed in each of the network element management systems 11, 12, as behavior of a duplicate managed object DMO that has been stored in the management information database MIB, (3) a transaction controller TRC for performing control to deliver a series of handling directives for a plurality of managed objects MO managed in each of the plurality of network element management systems 11, 12 to the simulated behavior execution controller SBEC, cause modified content to be reflected in the management information database MIB if simulated behaviors with regard to all handling directives end normally, and discard modified content with regard to all managed objects so that this modified content will not be reflected in the management information database if there is even one handling directive that ends abnormally, and (4) a communication controller CMN for delaying the series of handling directives for each of the network element management systems 11, 12 until all simulated behavior execution control ends normally.

In accordance with the network management system 21, the system holds the duplicate managed objects DMO and a series of handling directives regarding a plurality of managed objects MO can be simulated in the network management system 21 using the duplicate managed objects DMO. Consequently, when a network management request is issued by the service management network of the higher layer or by the user terminal 22, etc., the results of the simulation obtained using the duplicate managed objects DMO can be communicated immediately, thereby making it possible to respond to the network management request in a short period of time.

Further, after the simulation processing using the duplicate managed objects DMO ends normally, a series of handling directives is transmitted to each of the network element management systems 11, 12. As a result, it can be so arranged that the handling directives regarding managed objects MO in the network element management systems will not fail (i.e., so that the handling directives will not end abnormally). Accordingly, rollback processing can be dispensed with, the program logic of the network management system 21 can be simplified and the load upon the overall network, such as the load upon the network elements and network element management system, can be reduced.

(b) First Solution For Quick Response

Figure 4:
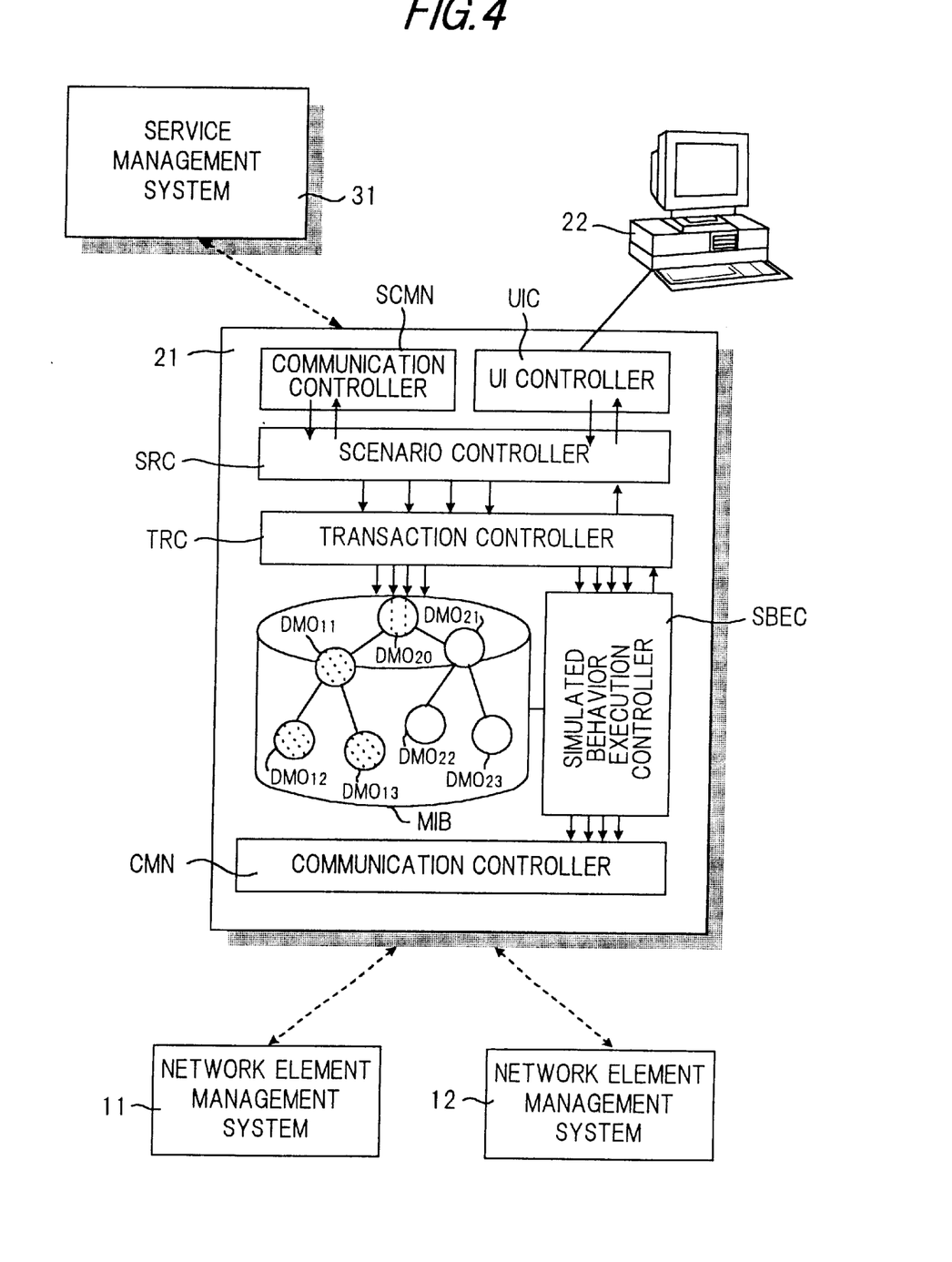
FIG. 4 is a diagram showing the configuration of a second embodiment of the present invention.

As shown in FIG. 4, the network management system 21 according to the present invention further includes a user interface controller UIC for interfacing the user terminal 22 and network management system 21.

When a network information acquisition request or modification request or some other network management request enters the network management system 21 from the user terminal 22 via the user interface controller UIC, the scenario controller SRC and transaction controller TRC handle a plurality of handling directives, which are necessary to implement these requests, as a series of scenarios and delivers these to the simulated behavior execution controller SBEC. The simulated behavior execution controller SBEC simulates the behavior of the managed objects MO regarding each of the handling directives in the scenario using the duplicate managed objects DMO that have been stored in the management information database MIB and inputs the results of simulated behavior processing to the user interface controller UIC via the transaction controller TRC. As a result, the user interface controller UIC notifies the user terminal 22 of the entered results of processing before the network management system 21 transmits the handling directives to the network element management systems 11, 12.

(c) Second Solution For Quick Response

As shown in FIG. 4, the network management system 21 according to the present invention further includes a communication controller SCMN for controlling communication between the service management system 31 and network management system 21.

When a network information acquisition request or modification request or some other network management request enters the network management system 21 from the service management system 31 via the communication controller SCMN, the scenario controller SRC and transaction controller TRC handle a plurality of handling directives, which are necessary to implement these requests, as a series of scenarios and delivers these to the simulated behavior execution controller SBEC. The simulated behavior execution controller SBEC simulates the behavior of the managed objects MO regarding each of the handling directives in the scenario using the duplicate managed objects DMO that have been stored in the management information database MIB and inputs the results of simulated behavior processing to the communication controller SCMN via the transaction controller TRC. As a result, the communication controller SCMN notifies the service management system 31 of the entered results of processing before the network management system 21 transmits the handling directives to the network element management systems 11, 12.

(d) Solution For Synchronizing Information

Figure 5:
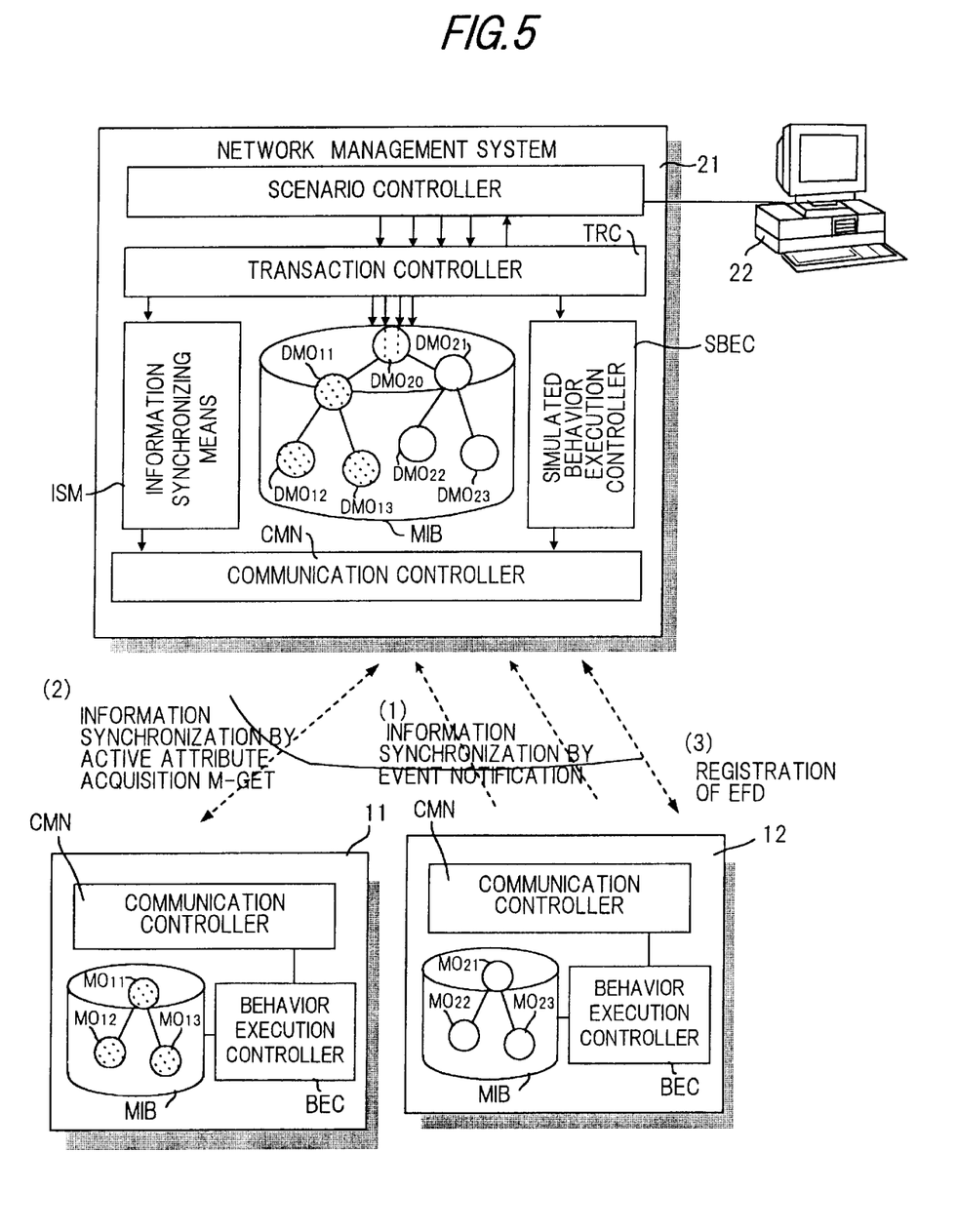
FIG. 5 is a diagram showing the configuration of a third embodiment of the present invention.

In order to dispense with rollback processing in the event of abnormal termination and in order to give notification of a correct response, it is required that the attributes of the duplicate managed objects DMO held by the network management system 21 be made to match the attributes of the managed objects MO managed by the network element management systems 11, 12. Accordingly, as shown in FIG. 5, the network management system 21 is provided with information synchronizing means ISM for matching the attribute information of the managed objects MO held by the network element management systems 11, 12 with the attribute information of the duplicate managed objects DMO held by the network management system 21.

More specifically, the information synchronizing means ISM includes (1) first means for synchronizing information passively by a notification from the network element management systems 11, 12, (2) second means for obtaining attribute information of managed objects from the network element management systems 11, 12 and synchronizing information actively if synchronization of information becomes necessary, and (3) third means for synchronizing information by selecting prescribed synchronizing means in dependence upon capabilities of the network element management systems 11, 12 and characteristics of the managed objects MO.

(e) Solution For Improving Agreement

In order to match (achieve agreement between) the attributes of the duplicate managed objects DMOs held by the network management system 21 and the attributes of the managed objects MO managed by the network element management systems 11, 12, the duplicate managed objects DMO and managed objects MO are subjected to identical operations in an identical sequence and the intervals of the operations applied to the duplicate managed objects DMO and managed objects MO are shortened.

Figure 6:
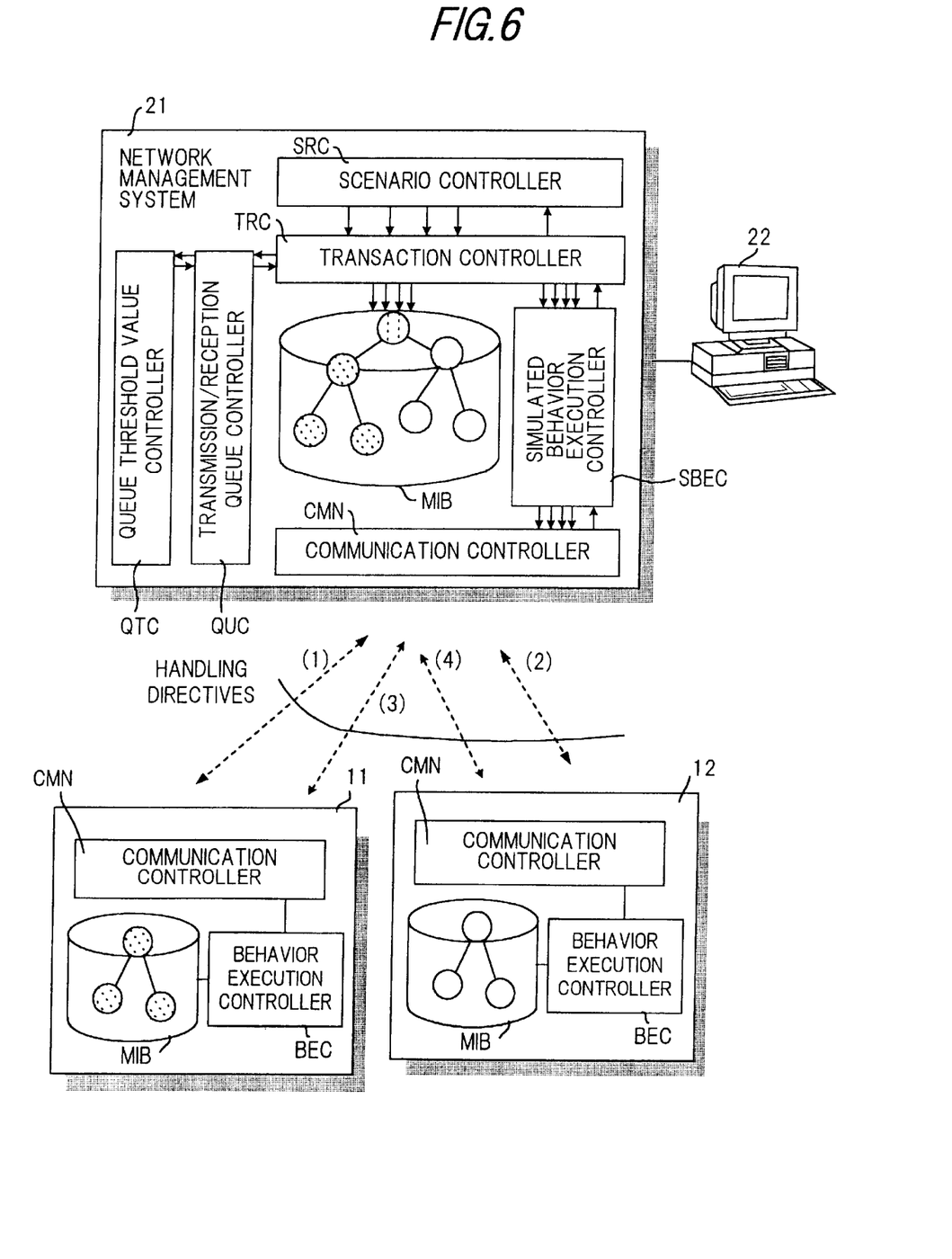
FIG. 6 is a diagram showing the configuration of a fourth embodiment of the present invention.

In order to achieve the sequential operations, the network management system 21 is further provided with a queue controller QUC for the handling directives, as illustrated in FIG. 6.

The queue controller QUC has a queue for each managed object MO. In a case where a handling directive is transmitted to the network element management systems 11, 12, the queue controller QUC temporarily queues this handling directive in the queue of managed object MO to be manipulated and transmits the handling directive in order from the head of the queue to the network element management systems 11, 12, Upon receiving a response notification from the network element management systems 11, 12, the queue controller QUC dequeues a handling directive from the queue and manages the state of transmission of the handling directive and the state of reception of response notification regarding the managed object.

Further, in order to meet the requirement for the shorter time intervals, the network management system 21 is further provided with a queue threshold value controller QTC, as shown in FIG. 6. The queue threshold value controller QTC manages a threshold value on a number of queued items for each of the network element management systems 11, 12 or for each managed object MO or for each specific handling directive in regard to each managed object, and the transaction controller TRC refuses execution of simulated behavior that is based upon a duplicate managed object DMO when the number of queued items exceeds the queue threshold value.

(B) Embodiments (a) First Embodiment

FIG. 1 is a diagram showing the configuration of a network management system according to a first embodiment of the present invention. Shown in FIG. 1 are the network element management systems 11, 12, the network management system 21 and the user terminal (user interface) 22 connected to the network management system 21.

Though network elements and the service management system are not illustrated in FIG. 1, the overall system has the network hierarchy shown in FIG. 8, the higher and lower layers have the manager—agent relationships shown in FIG. 9, and the layers communicate via the communication protocol CMIP. More specifically, the network management system 21 and the network element management systems 11, 12 having a manager (M)—agent (A) relationship and management of the network elements is carried out by performing communication using the communication protocol CMIP.

The network element management systems 11, 12 include the communication controller CMN, the management information database MIB and the behavior execution controller BEC for manipulating prescribed managed objects. The communication controller CMN implements control of communication with the network management system 21, which is the higher layer. The management information database MIB stores managed objects $MO_{11}$~$MO_{13}$, $MO_{21}$~$MO_{23}$, which are generated in order to manage the states of network resources (network elements, lines, etc.) constituting a network. The behavior execution controller BEC, which manipulates the managed objects $MO_{11}$~$MO_{13}$, $MO_{21}$~$MO_{23}$, (1) manipulates prescribed ones of these managed objects $MO_{11}$~$MO_{13}$, $MO_{21}$~$MO_{23}$ in accordance with handling directives from the network management system 21 or (2) manipulates prescribed ones of these managed objects $MO_{11}$~$MO_{13}$, $MO_{21}$~$MO_{23}$ autonomously to effect network control.

The network management system 21 has the scenario controller SRC, the management information database MIB, the simulated behavior execution controller SBEC, the transaction controller TRC and the communication controller CMN.

When a network management request is entered from the user terminal 22 or service management system (not shown), the scenario controller SRC, in accordance with the scenario, creates a plurality of handling directives, which are for a plurality of managed objects $MO_{ij}$, required by the management request, and outputs these handling directives sequentially.

The management information database MIB stores duplicates (duplicate managed objects $DMO_{11}$—$DMO_{23}$) of the managed objects $MO_{11}$~$MO_{13}$, $MO_{21}$~$MO_{23}$ managed in the network element management systems 11, 12. The simulated behavior execution controller SBEC simulates the manipulation (behavior) of a managed object MO, which is executed in each of the network element management systems 11, 12, as manipulation of a duplicate managed object DMO that has been stored in the management information database MIB, and notifies the transaction controller TRC of the results of the simulated behavior.

The transaction controller TRC performs control to (1) deliver a plurality of handling directives, which are output by the scenario controller SRC, to the simulated behavior execution controller SBEC in associated form, (2) cause modified content to be reflected in the management information database MIB for the first time if simulated behaviors with regard to all handling directives end normally, and (3) discard modified content with regard to all managed objects so that this modified content will not be reflected in the management information database if there is even one handling directive that ends abnormally. The communication controller CMN, which is for allowing communication with the communication controllers of the higher layer network element management systems 11, 12, delays the series of handling directives for each of the network element management systems 11, 12 until all simulated behavior execution control ends normally When a network information acquisition request or modification request or some other network management request is made by the service management system (not shown) or by the user terminal 22, the scenario controller SRC, in accordance with the scenario, creates a plurality of handling directives required to execute the request and inputs these handling directives to the transaction controller TRC sequentially.

The transaction controller TRC stores a handling directive, which has entered from the scenario controller SRC, as a transaction log and delivers this handling directive to the simulated behavior execution controller SBEC. On the basis of the entered handling directive, the simulated behavior execution controller SBEC subjects a duplicate managed object $DMO_{ij}$ to a prescribed manipulation, simulates behavior in regard to the managed object $MO_{ij}$ and communicates the results of the simulated behavior to the transaction controller TRC. The latter notifies the scenario controller SRC of the results, in response to which the scenario controller SRC inputs the next handling directive to the transaction controller TRC.

The simulated behavior execution controller SBEC continues to execute simulated behavior processing based upon the handling directives that enter sequentially from the scenario controller SRC via the transaction controller TRC and notifies the transaction controller TRC of the results of processing.

If all handling directives of the scenario end normally, the scenario controller SRC transmits the results of simulated behavior regarding the duplicate managed object $DMO_{ij}$ to the service management system or user terminal 22 as the results of processing in regard to the managed object $MO_{ij}$. Further, the scenario controller SRC instructs the transaction controller TRC to reflect (save) the results of processing in the management information database MIB.

In response, the transaction controller TRC causes the modified content to be reflected in the management information database MIB and then commands the communication controller CMN to transmit the above-mentioned handling directives to the network element management systems 11, 12. More specifically, the transaction controller TRC refers to the transaction log and commands the communication controller CMN to transmit only the handling directives for which attribute values change to the network element management systems 11, 12. The communication controller CMN transmits the specified handling directives (1)~(4) to each of the network element management systems 11, 12. As a result, the network element management systems 11, 12 perform prescribed processing for the first time in regard to a managed object $MO_{ij}$ based upon the specified handling directives. Since operation does not end abnormally in regard to the duplicate managed object $DMO_{ij}$, operation will not end abnormally also in regard to manipulation regarding the managed object $MO_{ij}$. As a result, rollback processing due to abnormal termination is no longer necessary.

The foregoing is for a case where simulated behavior ends normally in regard to all handling directives of a scenario. If operation ends abnormally for even one handling directive, the simulated behavior execution controller SBEC notifies the transaction controller TRC of the abnormal end and the transaction controller TRC notifies the scenario controller SRC of processing failure. As a result, the scenario controller SRC instructs the transaction controller TRC to perform rollback, and the transaction controller TRC responds by performing control to discard the modified content in regard to all duplicate managed objects thus far so that such content will not be reflected in the management information database MIB. The transaction controller TRC does not perform control to transmit handling directives to the network element management systems 11, 12 via the communication controller CMN.

In accordance with the arrangement set forth above, the design is such that before the network management system 21 transmits handling directives regarding a managed object $MO_{ij}$ to the network element management systems 11, 12, it is capable of verifying beforehand, using the duplicate managed object $DMO_{ij}$, that this series of handling directives has ended normally. As a result, handling directives for the network element management systems 11, 12 will not end abnormally and the need for rollback processing due to abnormal end can be eliminated.

Figure 2:
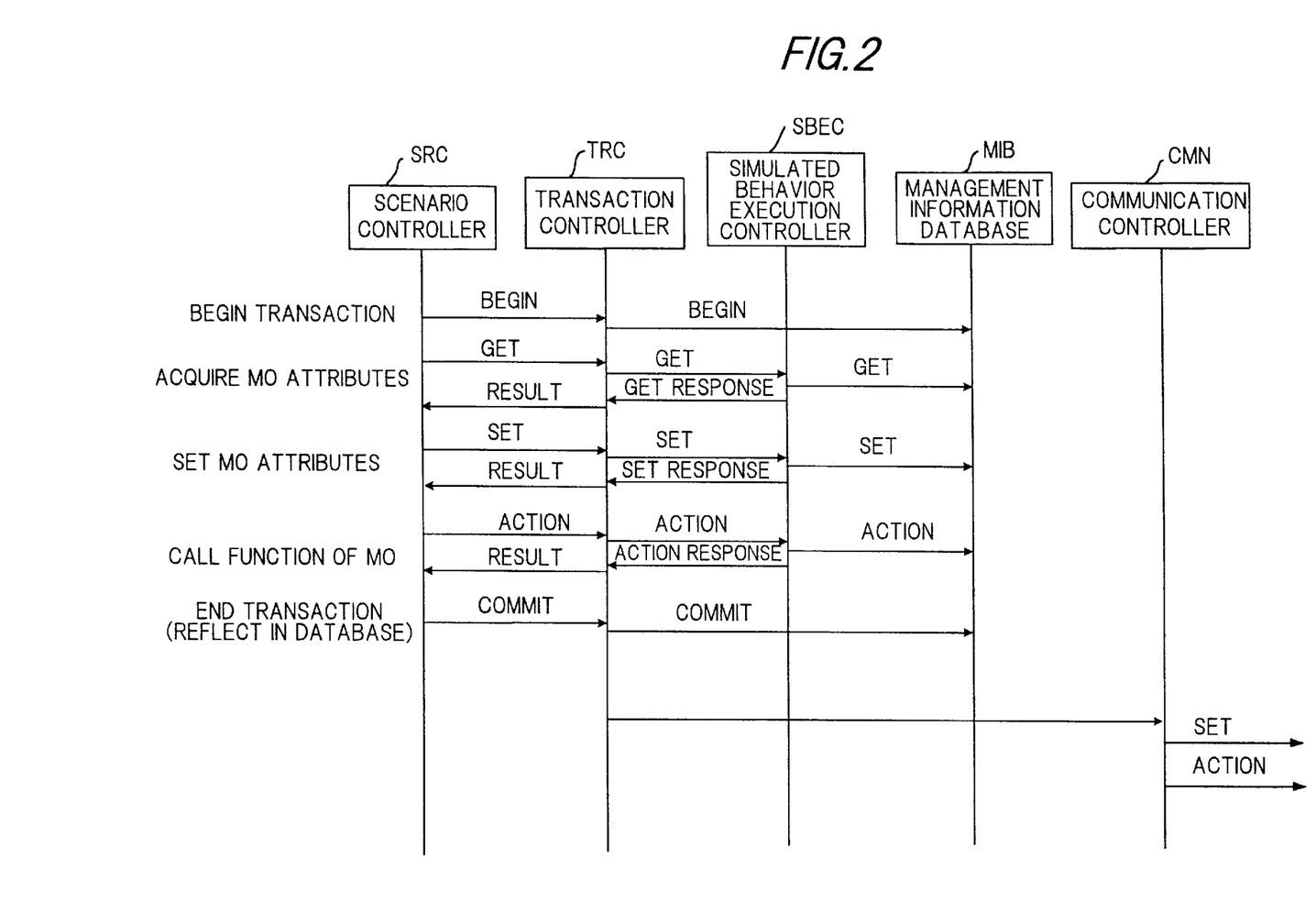
FIG. 2 is a diagram showing an event trace (when operation ends normally)

FIG. 2 is a diagram of an event trace when operation ends normally.

When a network information acquisition request or modification request or some other network management request is made by the service management system or by the user terminal 22, the scenario controller SRC, in accordance with the scenario, creates a plurality of handling directives required to execute the request and outputs these handling directives sequentially. More specifically, the scenario controller SRC first inputs "Begin", namely the start of a transaction, to the transaction controller TRC. The latter similarly inputs transaction start "Begin" to the management information database MIB.

Next, the scenario controller SRC inputs the initial handling directive (an attribute acquisition directive "Get" for acquiring the attribute of a managed object MO) to the transaction controller TRC. The latter stores the handling directive "Get" as a transaction log and delivers it to the simulated behavior execution controller SBEC. On the basis of the entered handling directive (the attribute acquisition directive "Get"), the simulated behavior execution controller SBEC acquires the attribute of a prescribed duplicate managed object $DMO_{ij}$ and inputs a "Get" response to the transaction controller TRC. The latter inputs the response result ("Result") to the scenario controller SRC.

Upon receiving the "Get" response result, the scenario controller SRC inputs the next handling directive (an attribute setting directive "Set" for setting the attribute of a managed object MO) to the transaction controller TRC. The latter stores the handling directive "Set" as a transaction log and delivers it to the simulated behavior execution controller SBEC. On the basis of the entered handling directive (the attribute setting directive "Set"), the simulated behavior execution controller SBEC sets the attribute of a prescribed duplicate managed object $DMO_{ij}$ and inputs a "Set" response to the transaction controller TRC. The latter inputs the response result ("Result") to the scenario controller SRC.

Upon receiving the "Set" response result, the scenario controller SRC inputs the next handling directive (a function implementation directive "Action" regarding a managed object MO) to the transaction controller TRC. The latter stores the handling directive "Action" as a transaction log and delivers it to the simulated behavior execution controller SBEC. On the basis of the entered handling directive "Action", the simulated behavior execution controller SBEC subjects a prescribed duplicate managed object $DMO_{ij}$ to function executing manipulation and inputs an "Action" response to the transaction controller TRC. The latter inputs the response result ("Result") to the scenario controller SRC.

If all of the handling directives of the scenario result in a normal end, the scenario controller SRC inputs transaction end "Commit" to the transaction controller TRC. The latter similarly inputs transaction end "Commit" to the management information database MIB, thereby causing the results of manipulation processing to be reflected in the management information database MIB.

Next, the transaction controller TRC refers to the transaction log and commands the communication controller CMN to transmit only the handling directives for which the attribute values change to the network element management systems 11, 12. In response, the communication controller CMN transmits the specified handling directives ("Set" and "Action") to the network element management systems.

Figure 3:
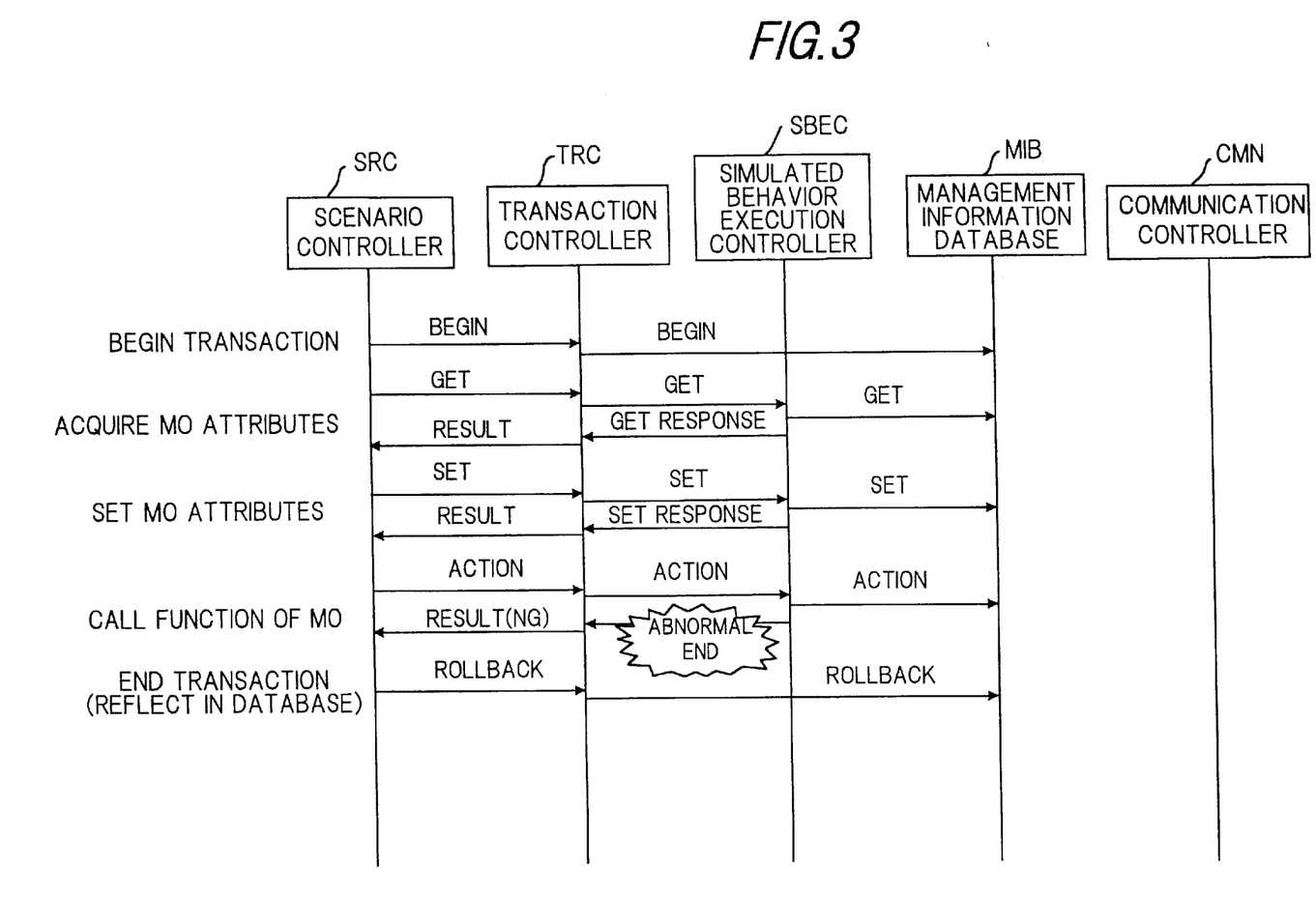
FIG. 3 is a diagram showing an event trace (when operation ends abnormally)

FIG. 3 is a diagram of an event trace when operation ends abnormally. This is for a case where the function implementation directive "Action" regarding a managed object MO results in abnormal end. The simulated behavior execution controller SBEC inputs the abnormal end regarding the function implementation directive "Action" to the transaction controller TRC. In response, the transaction controller TRC the abnormal end result ["Result (NG)"] to the scenario controller SRC. Upon receiving the abnormal end result ["Result (NG)"], the scenario controller SRC inputs transaction end "Rollback" to the transaction controller TRC, which similarly inputs transaction end "Rollback" to the management information database MIB. In response to the rollback directive, the management information database MIB does not save but discards the currently existing revised content. In addition, the transaction controller TRC does not perform control to transmit handling directives to the network element management systems 11, 12.

(b) Second Embodiment

FIG. 4 is a diagram showing the configuration of a network management system according to a second embodiment of the present invention. Components identical with those of the first embodiment shown in FIG. 1 are designated by like reference characters. Shown in FIG. 4 are the network element management systems 11, 12, the network management system 21, the user terminal 22 connected to the network management system 21, and the service management system 31.

The network management system 21 includes the scenario controller SRC, the management information database MIB, the simulated behavior execution controller SBEC, the transaction controller TRC, the communication controller CMN, the user interface controller UIC, which interfaces the user terminal 22, and the communication controller SCMN, which performs control for communication with the service management system 31.

The second embodiment is so adapted that when a network information acquisition request or modification request of some other network management request is issued by the user terminal 22 or service management system 31, the time for responding to this request is shortened. That is, the network management system 21 executes simulated behavior using a duplicate managed object $DMO_{ij}$ and, before transmitting handling directives to the network element management systems 11, 12, notifies the user terminal 22 or service management system 31 of the results of simulated behavior processing, thereby shortening response time. In case of an abnormal end, the network management system 21 does not send handling directives to the network element management systems 11, 12 and immediately notifies the user terminal 22 or service management system 31 of the abnormal response.

When Request is Issued By User Terminal

When a network information acquisition request or modification request of some other network management request is entered from the user terminal 22 to the network management system 21 via the user interface controller UIC, the scenario controller SRC and transaction controller TRC, in accordance with the scenario, create a plurality of handling directives required to execute the request and deliver each of these handling directives to the simulated behavior execution controller SBEC sequentially. The simulated behavior execution controller SBEC simulates the behavior of a managed object based upon each handling directive using a duplicate managed object DMO that has been stored in the management information database MIB and inputs the result of the simulated behavior to the user interface controller UIC via the transaction controller TRC and scenario controller SRC. The user interface controller UIC notifies the user terminal 22 of the response based upon the entered result.

Thus, before the network management system 21 transmits handling directives to the network element management systems 11, 12, it is capable of notifying the user terminal 22 of the result of simulated behavior control as a manipulation response. This makes it possible to shorten response time. In other words, by treating the result of simulated behavior control by a duplicate managed object DMO within the network management system 21 as being sufficiently reliable, the time needed to respond to the user terminal 22 can be shortened.

When Request is Issued by Service Management System

The foregoing is for a case where a request is issued by the user terminal 22. However, is also possible for a network information acquisition request or modification request to be issued by the service management system 31.

When a network management request enters from the service management system 31 via the communication controller SCMN, the scenario controller SRC and transaction controller TRC, in accordance with the scenario, create a plurality of handling directives required to execute the request and deliver each of these handling directives to the simulated behavior execution controller SBEC sequentially. The simulated behavior execution controller SBEC simulates the behavior of a managed object based upon each handling directive using a duplicate managed object DMO that has been stored in the management information database MIB and inputs the result of the simulated behavior processing to the user communication controller SCMN via the transaction controller TRC and scenario controller SRC. The communication controller SCMN notifies the service management system 31 of the response based upon the entered result.

Thus, before the network management system 21 transmits handling directives to the network element management systems 11, 12, it is capable of notifying the service management system 31 of the result of simulated behavior control as a manipulation response. This makes it possible to shorten response time. In other words, by treating the result of simulated behavior control by a duplicate managed object DMO within the network management system 21 as being sufficiently reliable, the time needed to respond to the service management system 31 can be shortened.

(c) Third Embodiment

FIG. 5 is a diagram showing the configuration of a network management system according to a third embodiment of the present invention. Components identical with those of the first embodiment shown in FIG. 1 are designated by like reference characters.

In order to improve the reliability of simulated behavior in the network management system 21, it is necessary to positively match (achieve agreement between) the attribute values of the managed objects MO in the network element management systems 11, 12 and the attribute values of the duplicate managed objects DMOs in the network management system 21. The third embodiment provides information synchronizing means for achieving matching (agreement). That is, the third embodiment differs from the first embodiment in that the information synchronizing means ISM is provided to match the attribute information of a managed object $MO_{ij}$ held by the network element management systems 11, 12 and the attribute information of a duplicate managed object $DMO_{ij}$ held by the network management system 21.

A method using an EFD (Event Forwarding Discriminator) stipulated by ITU-T X.721 generally is employed to match a managed object MO and a duplicate managed object DMO. The EFD makes it possible for an agent (the network element management systems 11, 12) to notify a manager (the network management system 21) of information relating to generation/deletion of managed objects and to modification of attribute values. The information synchronizing means ISM uses this information to synchronize (match) a managed object $MO_{ij}$ and a duplicate managed object $DMO_{ij}$. In a multivendor environment, however, not all agent systems are equipped with an EFD. This means that support must be provided for synchronization of information by other methods as well. Otherwise, it is highly likely that a difference will appear between the results of simulated behavior by the network management system 21 and results obtained when behavior is actually implemented by the network element management systems 11, 12.

Methods of synchronizing information that do not rely upon an EFD include (1) a method through which the attributes of managed objects to be manipulated are acquired by M-GET and matched before simulated behavior is implemented, followed by subsequently executing simulated behavior, and (2) a method matching attribute values passively by event notification from the network element management system.

Accordingly, the information synchronizing means ISM has (1) means for synchronizing information passively by event notification from the network element management systems 11, 12, (2) means for obtaining required attribute information of managed objects from the network element management systems 11, 12 and synchronizing information actively if synchronization of information becomes necessary, (3) means for synchronizing information using an EFD stipulated by ITU-T Recommendation X.721, and (4) means for synchronizing information by selecting any of means (1) through (3) in dependence upon capabilities of the network element management systems 11, 12 and characteristics of the managed objects MO.

If simulated behavior control ends normally in an environment in which synchronization of information is being performed appropriately between a managed object MO and a duplicate managed objects DMO, handling directives to the network element management systems 11, 12 almost never end abnormally in actuality. That is, abnormal end occurs only in a case when there is hardware failure of a network element or artificial modification of an attribute value from a network element management system during simulated behavior control. As a result, a network element management system almost never ends abnormally and rollover processing in regard to the network element management system becomes unnecessary.

(d) Fourth Embodiment

FIG. 6 is a diagram showing the configuration of a network management system according to a fourth embodiment of the present invention. Components identical with those of the first embodiment shown in FIG. 1 are designated by like reference characters.

In order to improve the reliability of simulated behavior in the network management system 21, it is necessary to positively match (achieve agreement between) the attribute values of the managed objects MO in the network element management systems 11, 12 and the attribute values of the duplicate managed objects DMOs in the network management system 21. In order to assure that such matching (agreement) will not be upset, the fourth embodiment provides the arrangement of the first embodiment with the queue controller QUC for handling directives and the queue threshold value controller QTC.

The queue controller QUC has a queue for each managed object. In a case where a handling directive is transmitted to the network element management systems 11, 12, the queue controller QUC temporarily queues this handling directive in the queue of the managed object that is to be manipulated by the directive and transmits a handling directive from the head of the queue to the network element management systems 11, 12. Upon receiving a response notification from the network element management systems 11, 12, the queue controller QUC dequeues the handling directive of interest from the queue and manages the transmission of the handling directive and the receipt of response notification regarding the managed object.

The queue threshold value controller QTC manages a threshold value on a number of queued items for each managed object. If the number of queued items, namely the number of handling directives has exceeded the threshold value, the transaction controller TRC refuses execution of simulated behavior that is based upon the duplicate managed object DMO. An arrangement can be adopted in which the queue controller QUC manages a queue for each of the network element management systems 11, 12 or for each specific handling directive in regard to each managed object, the queue threshold value controller QTC manages the threshold value on the number of queued items and, if the threshold value has exceeded the number of queued items, the transaction controller TRC refuses execution of simulated behavior that is based upon the duplicate managed object.

By thus managing queues, it is possible to assure the order of simulated behavior in regard to duplicate managed objects in a network management system and the handling directives in regard to managed objects of the network element management system and to improve the agreement between the attribute values of the managed objects and the attribute values of their duplicate managed objects. Moreover, by managing the threshold value of the number of queued items, the same manipulation can be applied to a managed object and its duplicate managed object in a short period of time and it is possible to improve the matching between a managed object and its duplicate managed object.

In accordance with the present invention, duplicate managed objects are held in a network management system and a series of handling directives regarding a plurality of managed objects can be simulated in the network management system using the duplicate managed objects. In accordance with the present invention, therefore, when a network management request is issued by the service management network, which is the higher layer, or by a user terminal, etc., simulated behavior using a duplicate managed object can be implemented and the results thereof can be communicated immediately, thereby making it possible to respond to the network management request in a short period of time.

In accordance with the present invention, it is so arranged that a series of handling directives is transmitted to each network element management system after it is verified that simulated behavior using a duplicate managed object has ended normally. As a result, it can be so arranged that a handling directive regarding a managed object in a network element management system will not fail (i.e., so that the handling directive will not end abnormally). This makes it possible to eliminate rollback processing, to simplify the logic of the network management system program and to alleviate the load upon the overall network such as the network elements and network element management system.

In accordance with the present invention, information synchronizing means is provided and it is so arranged that the information synchronizing means ISM matches the attribute values of the managed objects MO of the network element management systems and the attribute values of the duplicate managed objects DMO in the network management system. As a result, it is possible to improve the reliability of simulated behavior in the network management system 21.

In accordance with the present invention, a queue of handling directives regarding a managed object or the like is managed, thereby making it possible to assure the order of simulated behavior in regard to duplicate managed objects in a network management system and the handling directives (behaviors) in regard to managed objects of the network element management system and to improve the agreement between the attribute values of the managed objects and the attribute values of their duplicate managed objects. This makes it possible to improve the reliability of simulated behavior in the network management system. Moreover, the present invention is such that by managing the threshold value of the number of queued items, the same manipulation can be applied to a managed object and its duplicate managed object in a short period of time and it is possible to improve the matching between the attribute values of a managed object and the attribute values of its duplicate managed object.

As many apparently widely different embodiments of the present invention can be made without departing from the spirit and scope thereof, it is to be understood that the invention is not limited to the specific embodiments thereof except as defined in the appended claims.

What is claimed is:

1. A network management system, which is connected to one or a plurality of network element management systems each connected to one or more network elements, for performing network management via these network element management systems, comprising:

a management information database for storing duplicate managed objects that are duplicates of a number of managed objects which are generated in order to manage states of network resources and managed in the network element management system;

a simulated behavior execution controller for simulating behavior of a managed object, which is executed in each network element management system, as behavior of a duplicate managed object that has been stored in said management information database;

a transaction controller for performing control to deliver a series of handling directives for a prescribed managed object managed in each of the network element management systems to said simulated behavior execution controller, cause modified content that is based upon simulated behaviors to be reflected in said management information database if the simulated behaviors with regard to all handling directives end normally, and discard modified content with regard to all managed objects so that this modified content will not be reflected in said management information database if there is even one handling directive that ends abnormally; and a communication controller for delaying the series of handling directives for each of the network element management systems until all simulated behavior execution control ends normally.

2. The system according to claim 1, wherein the network management system and the network element management systems have a manager—agent relationship between them and network management is carried out by performing communication between the network management system and each of the network element management systems using a predetermined communication protocol.

3. The system according to claim 1, further comprising information synchronizing means for matching attribute information of the managed objects held by the network element management systems and attribute information of the duplicate managed objects held by the network management system.

4. The system according to claim 1, further comprising a user interface controller for interfacing a user terminal and the network management system;

wherein when a network management request has entered the network management system from the user terminal via said user interface controller, said transaction controller delivers a series of handling directives necessary to implement the request to said simulated behavior execution controller;

said simulated behavior execution controller simulates behavior of a managed object in regard to each handling directive as behavior of a duplicate managed object that has been stored in said management information database, and inputs results of the simulated behavior to said user interface controller via said transaction controller; and on the basis of the entered results of processing, said user interface controller notifies the user terminal of response to said network management request before the network management system transmits said series of handling directives to the network element management systems.

5. The system according to claim 1, further comprising a communication controller for controlling communication between a service management system and the network management system;

wherein when a network management request has entered the network management system from the service management system via said communication controller, said transaction controller delivers a series of handling directives necessary to implement the request to said simulated behavior execution controller;

said simulated behavior execution controller simulates behavior of a managed object in regard to each handling directive as behavior of a duplicate managed object that has been stored in said management information database, and inputs results of the simulated behavior to said communication controller via said transaction controller; and on the basis of the entered results of processing, said communication controller notifies the service management system of response to said network management request before the network management system transmits said series of handling directives to the network element management systems.

6. The system according to claim 1, further comprising a queue controller having a queue of handling directives for each managed object, wherein in a case where a handling directive is transmitted to the network element management systems, said queue controller temporarily queues this handling directive in the queue of the managed object that is to be manipulated by the directive, transmits handling directives in order from the head of the queue to the network element management systems, dequeues a handling directive of interest from the queue by receiving a response notification from the network element management systems, and manages transmission of the handling directive and the receipt of response notification regarding the managed object.

7. The system according to claim 6, further comprising a queue threshold value controller for managing a threshold value on a number of queued items for each managed object;

said transaction controller refusing execution of simulated behavior that is based upon a duplicate managed object when the number of queued items exceeds the queue threshold value.

* * * * *